US005832467A

United States Patent [19]
Wavish

[11] Patent Number: 5,832,467
[45] Date of Patent: Nov. 3, 1998

[54] BEHAVIOR PREDICTION FOR RULE-BASED DATA PROCESSING APPARATUS

[75] Inventor: Peter R. Wavish, West Hoathly, England

[73] Assignee: U.S. Philips Corporation, New York, N.Y.

[21] Appl. No.: 715,688

[22] Filed: Sep. 18, 1996

[30] Foreign Application Priority Data

Sep. 27, 1995 [GB] United Kingdom .................. 9519678

[51] Int. Cl.[6] ............................................... G06F 15/18
[52] U.S. Cl. ................................ 706/13; 706/45; 706/10
[58] Field of Search ...................... 395/13, 500; 706/10, 706/45, 13

[56] References Cited

U.S. PATENT DOCUMENTS 5,222,192  6/1993  Shaefer ..................................... 706/13

FOREIGN PATENT DOCUMENTS

| 0397259A2 | 11/1990 | European Pat. Off. ........ G05B 19/04 |
| 2261968 | 6/1993 | United Kingdom ............ G06F 15/16 |
| WO9321586 | 10/1993 | WIPO .............................. G06F 15/18 |

OTHER PUBLICATIONS

"Simulating and Implementing Agents and Multiple Agent Systems", M. Graham et al, Proc. European Simulation Multiconference, 1991, pp. 226–231.
"The Behaviour Language: User's Guide", R.A. Brooks, AI Memo 1227, Massachusetts Institute of Technology Artificial Intelligence Laboratory, Apr. 1990.
P.R. Wavish, "Real Time ABLE," Philips Res. Lab, Abstract, Dec. 1990.
D. Connah, et al., "An experiment in cooperation," Proc. of the First European Workshop on Modelling Autonomous Agents in a Multi–Agent World, Abstract, Aug. 1989.
D. Connah, et al., "A methodology for developing multi-agent systems," IEE Colloquim on 'Intelligent Agents', Abstract, Feb. 1991.
D. Connah, et al., "The architecture of an agent," Alvey Workshop on Multiple Agent Systems, Abstract, Apr. 1988.
D. Connah, et al., "A testbed for research on cooperating agents," Proc. 8th European Conf. on Artificial Intelligence, Abstract, Aug. 1988.
D. Connah, et al., "On being there: why simulated reality is better than the real thing," Artificial Intelligence Rev., vol. 2(3), Abstract, Dec. 1988.
R. Natowicz and G. Venturini, "Learning the Behavior of a Simulated Moving Robot using Genetic Algorithms," Proc. AINN 90, pp. 49–52, Dec. 1990.
T. Suzuki, et al., "A Design Method of MRACS with Fuzzy Adaptive Control Rules Using Genetic Algorithms," Nov. 1993 Int'l. Conf. on Industrial Electronics, Control, and Instrumentation, vol. 3, pp. 2288–2292.
R.A.A. Zitar and M.H. Hassoun, "Genetic Reinforcement–Based Rule Extraction for Regulator Control," Proc. 32nd Conf. on Decision and Control, pp. 1258–1263, Dec. 1993.
A. Bonarini, "Evolutionary Learning of general fuzzy rules with biased evaluation functions: competition and cooperation," First IEEE Conf. on Evolutionary Computation, pp. 51–56, Jun. 1994.

(List continued on next page.)

*Primary Examiner*—Robert W. Downs
*Attorney, Agent, or Firm*—Anne E. Barschall

[57] ABSTRACT

An RTA or similar rule-based agent (102) is enabled to construct a virtual simulation of its environment by the provision of an internal prediction module (100). The prediction module comprises a rule population run in tandem with the population (106) defining the agent behaviors. The prediction module rules represent predictions of agent behavior state changes and their accuracy is periodically checked (110), with more accurate rules being assigned a higher fitness rating. A genetic algorithm (108) defines mutation operators by which further rules are evolved from those having the highest fitness. When a predetermined level of fitness (prediction accuracy) is achieved, the prediction module rules provide (116) a virtual simulation of the environment to the agent behaviors by direct control in place of external (real world) stimuli.

11 Claims, 5 Drawing Sheets

OTHER PUBLICATIONS

T. Terano and Z–i. Muro, "On–the–Fly Knowledge Base Refinement by a Classifier System," AICOM, vol. 7(2), pp. 86–97, Jun. 1994.

Z–i. Muro and T. Terano, "Rule–Based Simulation with a Classifier System for Steel Manufacturing Processes," Proc. New Directions in Simulation for Manufacturing and Communications, pp. 294–300, Dec. 1994.

C–C Hsu, et al., "MRFACS With Nonlinear Concequents by Fuzzy Identification of System for Time Delay System," IEEE Int'l. Conf. on Fuzzy Systems, vol. 1, pp. 283–288, Mar. 1995.

T. Terano and K. Yoshinaga, "Analyzing Long–Chain Rules Extracted from a Learning Classifier System," Proc. Mar. 1995 IEEE Int'l. Conf. on Fuzzy Systems, vol. 2, pp. 723–728.

L.A. Best and R.D. Sanders, "Using Genetics–Based Learning Methods to Improve Simulation Model Fidelity," Johns Hopkins APL Technical Digest, vol. 16(2), pp. 123–135, Jun. 1995.

J.S. Bay, "Learning Classifier Systems for Single and Multiple Mobile Robots in Unstructured Environments," Proc. of SPIE, vol. 2591, pp. 88–99, Dec. 1995.

FIG. 1

| EN | S | Q | INT | SA |
|----|---|---|-----|-----|
| 10 | 1 | 0 | N/A | 100 |
| 26 | 0 | 1 | N/A | 150 |
| 16 | 1 | 0 | N/A | 200 |
| 34 | 0 | 0 | 1 | 250 |
| 36 | 0 | 0 | N/A | 300 |
| 28 | 1 | 0 | N/A | 350 |
| 12 | 0 | 0 | 0 | 400 |
| 30 | 0 | 0 | 1 | 450 |
| 18 | 1 | 0 | N/A | 500 |
| 42 | 0 | 0 | 1 | 550 |
| 44 | 0 | 0 | N/A | 600 |
| 32 | 0 | 0 | 1 | 650 |
| 46 | 0 | 0 | N/A | 700 |
| 20 | 1 | 0 | N/A | 750 |
| 48 | 0 | 0 | 1 | 800 |
| 50 | 0 | 0 | N/A | 850 |
| 52 | 1 | 0 | N/A | 900 |
| 14 | 0 | 0 | 0 | 950 |

| I | T | 1 | 2 | 3 | 4 | 5 | 6 | 7 | 8 | Eff. |
|---|---|---|---|---|---|---|---|---|---|------|
|   | X | 0 | 1 | – | – | 0 | 1 | 0 | – | –    |
|   | A | – | 1 | – | 1 | – | 1 | – | 1 | 65%  |
|   | B | 0 | 1 | – | – | – | – | 0 | 1 | 38%  |
|   | C | 0 | 1 | 0 | 1 | 0 | 1 | 0 | 1 | 62%  |
|   | D | 0 | – | 0 | – | 0 | – | 0 | – | 41%  |

| II | T | 43 | 44 | 45 | 46 | 47 | 48 | 49 | 50 | Eff. |
|----|---|----|----|----|----|----|----|----|----|------|
|    | X | 1  | –  | 0  | 1  | –  | –  | –  | 0  | –    |
|    | A | 1  | –  | –  | 1  | –  | –  | 1  | –  | 67%  |
|    | C | 1  | –  | 0  | –  | 1  | –  | –  | 0  | 58%  |
|    | E | 1  | 0  | 1  | 0  | 1  | 0  | 1  | 0  | 68%  |
|    | F | –  | 0  | –  | 0  | –  | 0  | –  | 0  | 31%  |

FIG. 4

BEHAVIOR PREDICTION FOR RULE-BASED DATA PROCESSING APPARATUS

The present invention relates to a rule-based data processing apparatus and a method for use in such an apparatus for optimization of behavioral prediction.

Rule-based processor systems may support behavior languages in which behaviors are either simple operations performed on a value, or rules, where a rule defines logical and temporal relations between events (behavior state changes). Accordingly, events associated with the condition portion of a rule (also known as the left hand side behaviors of a rule) cause subsequent events associated with the response portion (right hand side behavior) of the rule. An example of such a rule-based real time language is Real Time ABLE (RTA), described in Proceedings of the European Simulation Multiconference 1991 at pages 226–231. ABLE stands for Agent Behavior LanguagE and is a highly concurrent production rule language for simulating agents and multiple agent systems. ABLE provides for tighter integration of time with the production rule system. The language may conveniently be compiled into a representation which comprises a number of interconnected elements such as (for virtual logic circuits) AND elements, OR elements, delay elements and so on. RTA uses a propagation technique as opposed to a search strategy to obtain a fast production rule system. A further example of a rule-based language is given in "The Behavior Language; User's Guide" by R A Brooks, Al Memo 1227, Massachusetts Institute of Technology Artificial Intelligence Laboratory, April 1990.

When an autonomous agent is placed in a particular environment, its behavior or activity is the product both of causal processes happening within itself and of causal processes happening within its environment. It is the interaction of these two sets of causal processes which produce the observed behavior.

At a finer level of detail, the agents' behavior can be described as a sequence of events corresponding to changes in its internal state, where these events are caused directly by the licenses forming the agents' program, and indirectly by causal processes in the agents' environment which affect the behavior of the agent as it interacts with it.

A conventional way for an agent to predictively model how its environment will behave is to provide the agent with an explicitly programmed simulation of it, or to program the agent itself to build and maintain an explicit model. Either technique creates programming problems however. Executing such simulations is expensive because many entities in the agents' environment may be acting concurrently and so require simulating, regardless of what the agent is currently attending to.

A technique which avoids programmed simulations is proposed in "Abstract Reasoning as Emergent from Concrete Activity" by David Chapman and Philip E. Agre, MIT Al Laboratory Technical Report, 1986. Their proposal, intended to model the concept of internalization in an artificial intelligence (AI) system, is to create a virtual simulation by using the activity of the agent itself to construct the perceptual input. They refer to this as creating a "minds eye" because, from the agents' point of view, the dynamics of the internal state of the agent induced by the feedback is indistinguishable from the dynamics resulting from real perception. Whilst the Chapman and Agre technique of virtual simulation provides benefits in terms of enabling study of agent behavior once isolated from its environment, there is no suggestion as to how the technique may be applied to rule-based systems.

It is therefore an object of the present invention to provide a means for an agent in a rule-based system to generate its own virtual simulation of perceived environment.

In accordance with the present invention there is provided a data processing apparatus including memory means having stored therein one or more agents defined by a first set of rules, each rule being in the form of a condition portion and an associated response portion, the condition portion of each rule requiring the presence of one or more specified agent behavior states or external inputs and the apparatus comprising means for responding to any said condition being satisfied by generating the associated response, characterized in that the apparatus has stored therein a second set of rules and is arranged to run said first and second sets in parallel, wherein each of said second set of rules generates a prediction of one or more agent state changes for the first set of rules, the apparatus further comprising means operable to monitor the prediction accuracy of one or more rules of the second set in accordance with predetermined criteria, to selectively modify said one or more rules of the second set until a level of accuracy in accordance with said predetermined criteria is met or exceeded, and to cause agent state changes of one or more rules of the first set in dependence on predictions of the second rule set.

By triggering the response portions of the rules of the first set in dependence on the predictions (the generated responses) of the rules of the second set, the agent or agents governed by the first rule set will react as if responding to their environment—the usual cause of condition portion satisfaction. In this way, a virtual simulation of the environment is provided through the interaction between the rules of the first set (the agent or agents) and the rules of the second set. These rules of the second set will be referred to herein as a prediction module.

Respective fitness values may be held in the apparatus for each of the second (prediction module) set of rules, with these values being incremented or decremented by the apparatus in view of the relatively higher or lower levels of prediction accuracy for each rule. Suitably, those modified rules are added to the prediction module rule set (rather than replacing their "originating" rules) with rules only being deleted from the prediction module rule set when their prediction accuracy is below a predetermined threshold level.

As will be described, one suitable arrangement for rule modifications involves the use of genetic algorithms and the apparatus may suitably be configured to generate chromosomal representations of the prediction module rules to which such genetic algorithms may be applied.

Also in accordance with the present invention there is provided a method of generating a virtual simulation of an environment for an agent having a first set of rules in a rule-based data processing system, wherein each of said rules is in the form of one or more behaviors defining a condition and one or more further behaviors defining an associated response generated when said condition is satisfied, the method comprising: providing a prediction module including a further set of rules, the respective response of each of said further set of rules comprising a prediction as to a state change for a specified behavior of the first set of rules in response to interaction by said agent with the said environment; placing the agent in interactive interrelationship with the said environment and monitoring the accuracy of prediction by the rules of the prediction module in accordance with predetermined criteria; selectively modifying one or more rules of the prediction module until a level of accuracy in accordance with said predetermined criteria is met or exceeded; and generating a virtual simulation of the environment based solely on the interaction of the rules of the agent and prediction module.

By use of a virtual simulation, no explicit model of the environment is needed, which simplifies the design of the agent and can reduce the programming problems and computational resources required to perform the simulation. Deeper problems associated with representing and maintaining explicit internal models are also avoided.

There are some proposals for neural networks which automatically develop a capability for representing the environment without being trained. The advantage of the present invention is that what is learnt is a set of symbolic rules that can subsequently be executed efficiently on standard computer hardware.

Many machine learning systems require an explicit mechanism for distributing credit amongst the parameters of the systems, e.g. the bucket brigade in classifier systems or the back propagation algorithm in neural nets. The credit assignment problem is reduced in the present invention because each rules fitness is evaluated directly and, in many cases, the credit can then be assigned directly.

Further features and advantages of the present invention are recited hereinafter and in the attached claims, to which reference should now be made.

The present invention will now be described, with particular reference to RTA agents by way of example only, with reference to the accompanying drawings, in which.

Figure 1:
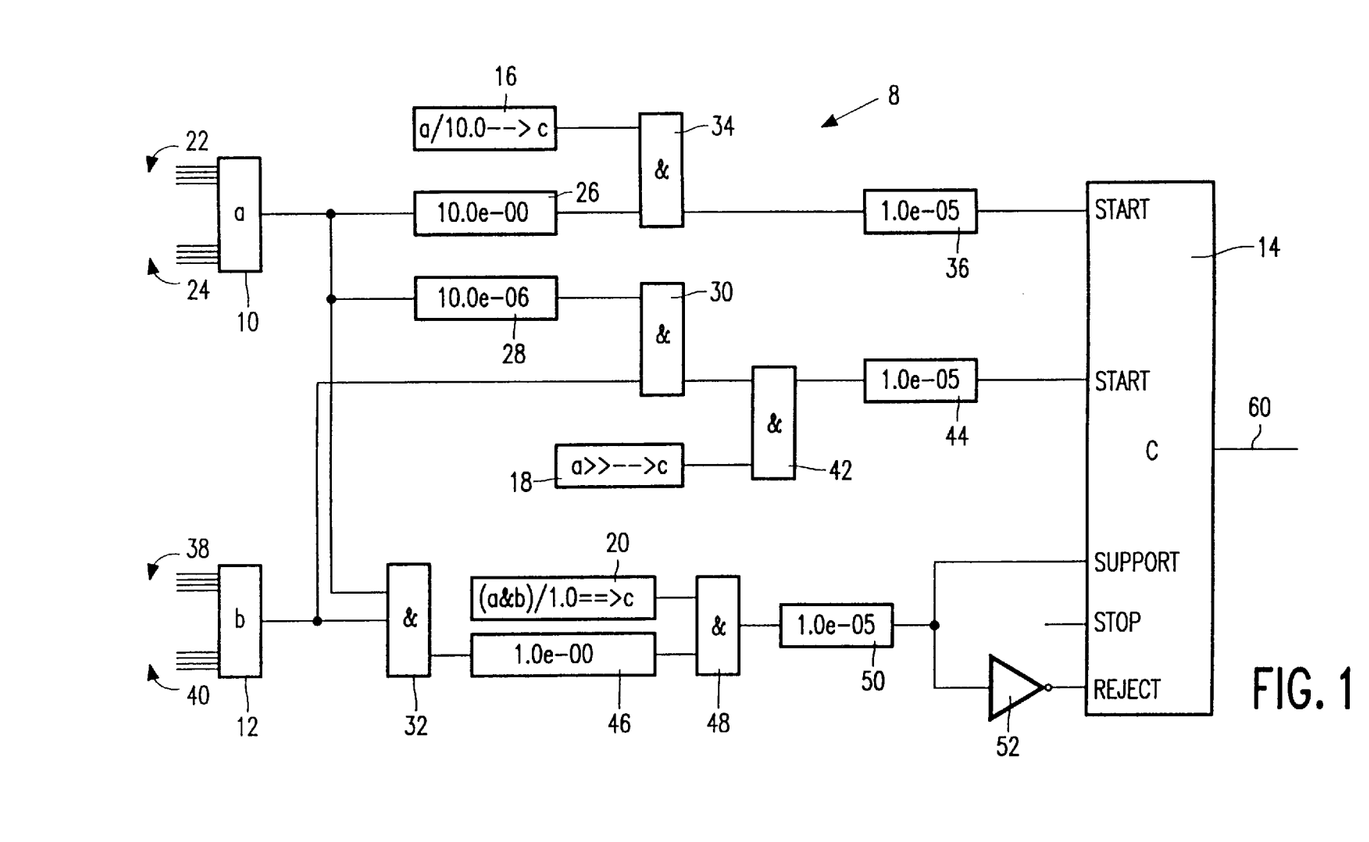
FIG. 1 is a logic circuit representation of an agent architecture.

For the purposes of illustration, FIG. 1 shows an asynchronous logic circuit representation of an agent 8 compiled from a simple RTA system. Three simple behaviors a, b, and c (registers 10,12,14) are combined in three different rules, represented as registers at 16, 18, and 20, with the rule functions being enabled or disabled in dependence on whether or not the respective registers are active, and being implemented by combinations of logic functions and time annotations (delay elements). The Figure shows a simple implementation with each of the rules having a state change for behavior c defining the response, such that the general propagation through the circuit of state changes is from left to right. In a more complex implementation, for example where behavior c formed part of the condition portion of a rule having behavior b defining the response, there would be state change propagation additionally from right to left of the Figure (e.g from c to b).

In the implementation of FIG. 1, register 10 (behavior a) has a plurality of independent start or support inputs 22 and a plurality of independent stop or reject inputs 24: the difference between start and support and between stop and reject lies with whether they receive the result of a license or a schema respectively, as discussed below. The output of behavior a is respectively connected to the input of a first delay element 26, via a short (1 microsecond) delay element 28 to a first input of an AND element 30, and to a first input of an AND element 32. The delay element 26 sets a delay of 10.0 seconds (although it will be readily appreciated that other units of time may be used) such that the output of the element 26 will be turned on 10 seconds after the input is turned on: the output will however be turned off at the instant the input is turned off. The output of the delay element 26 is combined with the output of rule function register 16 at AND element 34 (as is required by RTA) and, through a delay element 36, is connected to a first start input of register 14 (behavior c). The register 14 has an output 60. The delay of element 36 (suitably 10 microseconds) is provided to allow the state to settle before being read.

Register 12 (behavior b) has a plurality of start or support inputs 38, and a plurality of stop or reject inputs 40. The output of behavior b is connected to second inputs of each of the AND elements 30 and 32. The output of AND element 30 is combined with the output of rule function register 18 at AND element 42 and from there via a delay element 44 (again to allow the state to settle before being read) to a further start input of the register 14. The AND element 32 has its output connected to the input of a further delay element 46 having a delay of 1.0 second. The output of the delay element 46 is combined with the output of rule function register 20 at AND element 48 and, via a delay element 50 (again to allow the state to settle before being read), is connected to support input of the register 14 and to the input of an inverter 52. The inverter output is connected to a reject input of the register 14.

The agent of FIG. 1 embodies the following RTA program rules:

$$a/10.0 \to c \quad (1)$$

$$(a\&b)/1.0 \Rightarrow c \quad (2)$$

$$a >> b \to c \quad (3)$$

(1) and (3) are examples of a type of rule called a license. (1) has the effect of setting the status of behavior c (register 14) if the status of behavior a (register 10) has been set continuously for 10 seconds. In FIG. 1, this license is effected by the delay 26 connected between the register 1 0 and one of the start inputs of the register 14. (3) is an AND_THEN license requiring the status of behavior a to be presented before the status of behavior b (register 12): delay 28 ensures the correct order when behaviors a and b output simultaneously.

(2) is a type of rule called a schema which is similar to a license but which provides the additional effect that as soon as the conditions which satisfied the schema no longer exist then the consequence of the schema is retracted. In this example, the status of behavior c is set if behaviors a and b (the outputs of registers 10 and 12) are both set continuously for 1.0 second. This effect is provided by the output of the AND element 32 being coupled via the delay element 46 to the support input of the register 14. However, the status of behavior c must also be reset if either the status of behavior a or the status of behavior b is reset. This effect is achieved by the inverter 52 connected between the output of the AND element 32 and the reject input of the register 14.

The elements of the representation can be regarded as edge-triggered by virtue of the propagating or forward-chaining nature of the apparatus. The inputs to register elements 10,12 and the output of the register element 14 will generally be connected to further sections of a larger asynchronous logic circuit representing further agents and/ or their environment.

Figure 2:
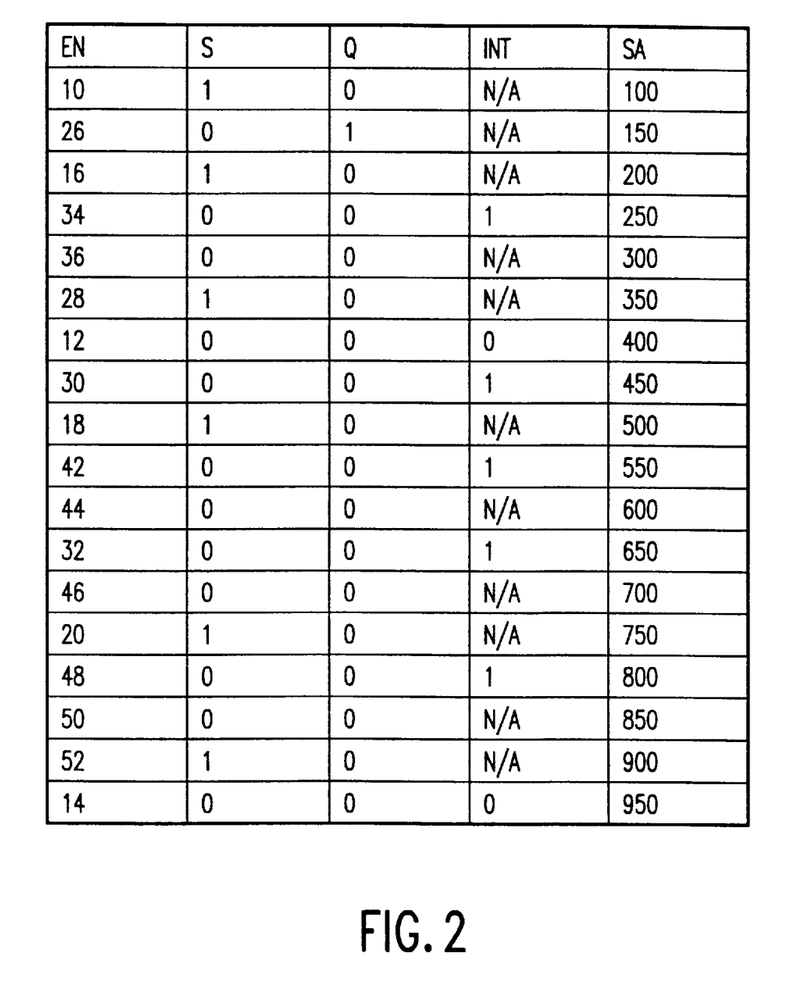
FIG. 2 is a state table representation of the agent architecture of FIG. 1.

Such a logic representation of an agent may be stored in the memory of a data processing apparatus in the form of a table as shown in FIG. 2. Each of the behaviors (register elements 10,12,14), time annotations (delay elements 26,28, 36,44,46,50) logic functions (elements 30,32,34,42,48,52) and rule functions (register elements 16,18,20) shown in FIG. 1 has a row in the table. Each row in the table identifies the element number EN (for the sake of clarity the reference numerals of the elements as they appear in FIG. 1 are used), a state flag S of the device, a queued status flag Q of the device (as will be explained), the internal status INT, and a propagate function start address SA. When the state of the element to which the row of the table relates changes (referred to herein as an event), a propagate function is executed to effect any appropriate changes to all of the elements which may be affected by such a change. These propagate functions are conveniently arranged at certain memory locations or start addresses SA. Changing the state of elements by propagation in such a manner rather than by searching for all of the elements affected by an event allows the apparatus to operate efficiently.

Figure 3:
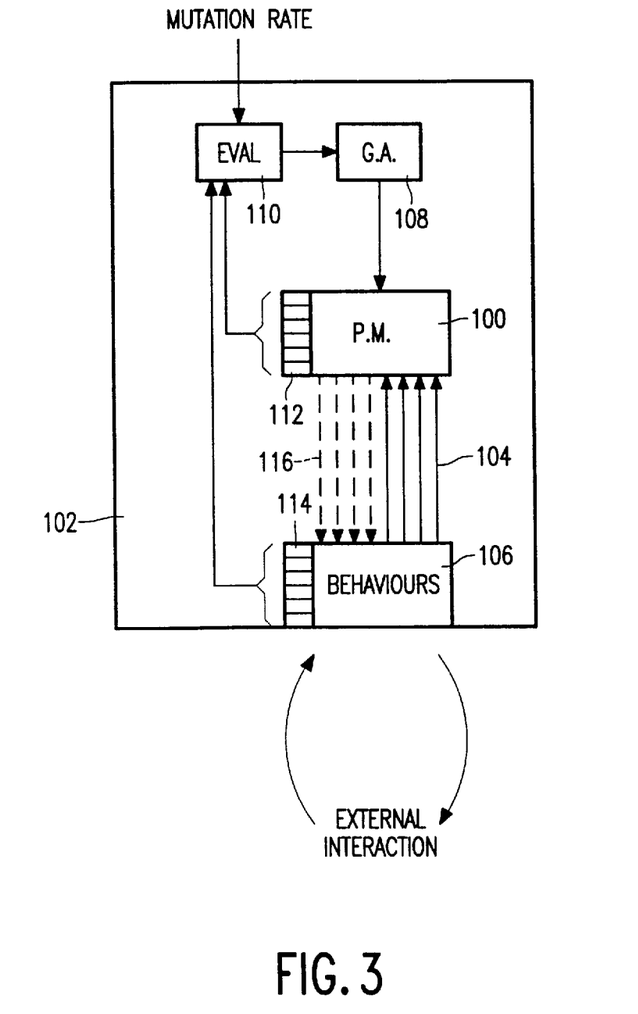
FIG. 3 is a schematic representation of an agent with an associated prediction module.

To enable the generation of a virtual simulation of an agent environment a prediction module 100 is built into the agent 102, as schematically illustrated in FIG. 3. The module 100 monitors the sequence of events (behavior state changes) via links 104 occurring within the agent behavior 106 as the agent interacts with its environment. The prediction module 100 is constructed as an evolving population of RTA rules whose predictions are optimized by a genetic algorithm 108 which rules form a second RTA programme running in real time in parallel with the RTA programme defining the behaviors of the agent. Through evolution by genetic algorithm (to be described below), events predicted by the prediction module become correlated with the events that actually take place in the agents' real-world environment, assuming that the event prediction of the prediction module does not actually influence the behavior of the agent while the learning process is taking place (i.e the prediction module operation is "invisible" to the agent behaviors).

The fitness of each rule in the prediction module is evaluated (at 110) by comparing its predictions (represented at 112) with the stream of events occurring within the agent (represented at 114). Rules which predict events correctly are rewarded, and rules which predict events that do not actually occur are penalized. Rules with a high fitness according to this measure are combined to produce new rules, and rules with a low fitness are discarded.

The result after the genetic algorithm has been running for some time is that the population of RTA rules in the prediction module 100 will include rules which have a high fitness and hence accurately predict the behavior of the agent. As the agent behaviors 106 have been interacting with the agents' environment, a virtual simulation of the agents' environment may be generated by replacing the external behavior inputs with direct behavior control (represented by dashed lines 116) from the prediction module—in effect adding the prediction module rules to those of the agent behaviors.

The technique exploits the representational capability of rule-based systems such as RTA and the power of genetic algorithms to evolve structures which have the desired behavior. RTA rules have been developed over some years to provide a convenient and efficient means of describing and implementing the causal behavior of agents and physical processes. Each rule operates independently and in parallel with all other rules, so a set of RTA rules is a suitable population of independently behaving individuals on which a genetic algorithm can operate.

An important characteristic of rules such as RTA rules is that large populations of rules can be executed in real time because their computation is change driven rather than state driven. Accordingly, for most of the time, most rules of a population are inactive because their inputs do not change state, and therefore require no computation time. This makes it possible to consider running the genetic algorithm on a large population of rules in real time inside an individual agent as it interacts.

Another property of rules such as RTA rules is that they contain timing information which determines time delays from when the conditions of a rule are satisfied to when the event predicted by the rule actually occurs, so sets of RTA rules can describe and simulate the time-dependent aspects of the causal behavior of agents and physical processes such as future state changes, which property makes them particularly suited for use in the prediction module.

In use, the genetic algorithm 108 mimics evolution by mating the fittest individuals in the prediction rule population to produce even fitter offspring. Much of the power of genetic algorithms comes from the cross-over operation which results in an implicit search for substructures which lead to fit individuals. They are therefore well suited to evolving individuals, like RTA rules, whose behavior depends on their structure.

The genetic algorithm requires the following five components:

a chromosomal representation of individuals in the population;

a source of, or method of creating, the initial population;

an evaluation function which rates individuals in terms of fitness;

genetic operators that determine the composition of the offspring;

values for the parameters of the algorithm (e.g. mutation rate).

The chromosomal representation in the genetic algorithms is suitably a bit string, which represents (directly or indirectly) the structure of a rule, its time delays, and the particular components of the agents' state to which it relates. An alternative to bit string representation would be to provide genetic operators which operate directly on the tree structure representation of the rule used internally by the RTA compiler.

The initial prediction rule population may be defined in RTA by an external operator as a set of rules representing initial hypotheses about the agents' environment, it may be a pseudo-random selection from a pre-loaded population of rules available to the prediction module and connecting the components of the agents' internal state, or it may be at least partially chosen after a period of monitoring of the agent based on statistical considerations applied to the type of, and temporal relationships between, behavior state changes noted. In any of these cases, the pre-loaded population may include forced selections to ensure that it provides a basic plan of the range of components of the agents' internal state which are relevant.

The evaluation function as used at 110 (FIG. 3) is a very important feature; as already described, this is applied to the predictions generated by the set of RTA rules in the prediction module forming an RTA network operating alongside the original agent. This makes it possible to evaluate the fitness of all the rules of the prediction module at much the same rate that the agents' own RTA rules are executed.

Figure 4:
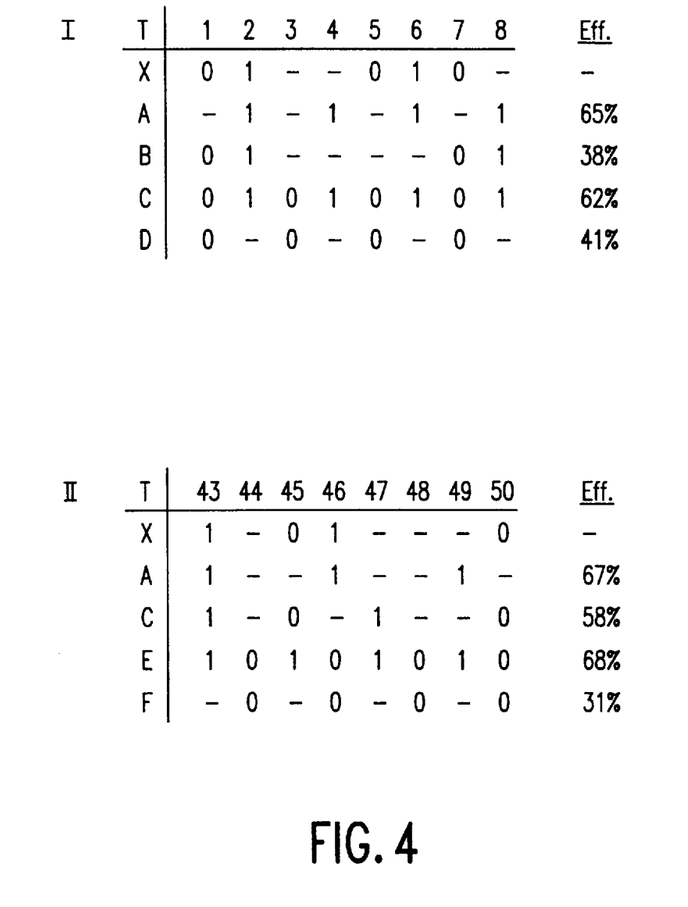
FIG. 4 illustrates the effect of successive modifications of a prediction module rule by genetic algorithm.

FIG. 4 shows at I a part of a binary representation X in respect of a behaviors state changes in the agent 102 of FIG.

3 over a number of time periods T, where "1" indicates a behavior switching on, "0" represents the behavior switching off, and "-" indicates no behavior state change. An initial population of behavior prediction representations A,B,C,D, (that is to say the predictions based on four rules of the prediction module for the same time periods) is also shown. The evaluation function determines a fitness value for each rule on the basis of its prediction: these fitness values (purely illustrative percentage values are shown) determine which prediction rules are the most accurate and provide the most promising basis for development—those rules producing A and C in the case of the first example. As will be noted, some of the prediction module rules (such as that producing A) only predict a single type of behavior event, such as switching on of the behavior, but this will not cause a problem in the virtual simulation if there is a further rule which predicts the switching off of the behavior at the appropriate points.

From the rules producing predictions A and C, further prediction rules leading to predictions E and F are developed, for example by exchanging parameters between prediction rules and, as shown at 11, the fitness of these rules is also evaluated by comparison of their predictions against the actual rule firings X. It will be noted that the fitness of each of rules producing predictions A and C has altered since first tested at I: this may be due to the continuing evaluation of these rules with accumulation of rewards and penalties, or may be due to mutations having been applied to those rules individually. As can be seen, prediction A is improving marginally in measured fitness over a longer test whilst prediction C is reducing. The first offspring of rules giving predictions A and C (the rule giving prediction E) is found to have a very high fitness whilst the second, giving prediction F, is low. Consequently, a second generation modification might suitably be based on rules giving predictions A and E, the second generation comprising either a combination of the two rules or separate mutations applied to each.

Each rule in the prediction module is arranged so that, when it fires, its prediction is compared with the real occurrence of the predicted event within a small time window. For example, one of the prediction module rules may be:

$$a/1.0\text{->}c$$

which requires (predicts) behavior c to switch on one second after behavior a has switched on. For the purposes of evaluation, this rule may be modified to:

$$a/0.8\text{->}c/0.4$$

where c is switched on for 0.4 seconds, 0.8 seconds after a is switched on, in effect providing a time window of ±0.2 seconds around the prediction time. Such modification has the benefit that the rule becomes reset after the window (when it would otherwise assume behavior c to be still switched on). If there is a match, that is to say the predicted event actually occurs (behavior c in the agent switches on) within the time window, the fitness value associated with the rule is increased. If the predicted event does not occur, or occurs outside the time window, the fitness value is decreased.

Preferably, as described above, the fitness evaluation function enables partial success to be accumulated, with the fitness rewards/penalties assigned to a rule depending on how far away (in time, and in terms of behavior) its predictions are from the real events which occur. It should be recognized that, within the agent, it is quite possible for there to be more than one cause for a behavior state change (for example external input or propagation through the compiled asynchronous logic circuit). The prediction module rules do not reproduce the agents' rule set but instead model the agents' environment in terms of a compiled rule set predicting regularities in agent behavior state changes due to environmental factors.

With the above example, the rule will have a very high fitness if, every time it predicts agent behavior c turning on, this actually occurs, regardless of whether or not agent behavior c turns on at other times, due to other (not predicted) causes. The rule will not be penalized for failure to predict an event, only for predicting events which do not occur.

For the genetic operators, crossover and mutation operators at least are required to give good optimization and coverage of the space. If a tree structured chromosome representation is used, then special operators would need to be defined (or, in a more complex system, evolved) to act on these trees. It is preferred to define the operators so that the changes they make are sensible with regard to the semantics of rules: for example, a mutation could turn a disjunction into a conjunction.

Lastly, the parameters of the algorithm are chosen on the basis of factors such as the relative complexity of the agent. For an agent having a large number of behaviors, the mutation rate should be relatively slow such as to enable fitness to be evaluated on the basis of a number of rule firings. In the example of FIG. 4, a relatively slower mutation rate would enable the fitness of each of predictions A,B,C,D to be evaluated against a relatively higher number of occurrences of actual rule firing X before settling on those rules to form the basis for the first mutated set of rules giving the predictions at II.

One way of structuring the set of rules is that each event type (relating to a particular behavior of the agents' internal state) has its own set of rules which together provide a capability for predicting the event.

As described, the conditions defined in rules in the prediction module are restricted to components of the internal state of the agent itself, such that there is a single layer of rules predicting events. The technique may be extended to multiple layers of rules to provide a more powerful simulation capability. The prediction module system would then require means for propagating rewards back to rules which predict intermediate events, so making it more complex.

To generate the virtual simulation following a period of evolution, the rules in the prediction module then interact (116; FIG. 3) with the rules forming the original agent, such that the agent behaves as though it is interacting with its environment, even though its external links to the environment are no longer actually there. In this way the agent interacts with a virtual simulation of its environment which is dynamically constructed by the prediction module's monitoring of the agents' own behavior. The simulation is virtual in the sense that the state variables of the environment are not represented explicitly, and the simulated environment is only visible to the "minds eye" of the agent for which it is generated by the agents' internal prediction module.

When interacting with a real environment, evolution may be slow, because it may take many presentations of the same situation for the genetic algorithm to be able to evolve accurate predictions for it in the case of complex behaviors. A way around this could be for the agent to be forced to repeatedly engage in particular situations to increase the frequency of instances for prediction and correlation.

Due to the representational limitations of a single layer of explicit symbolic rules, "roughly" predicted sequences of action may rapidly diverge from reality, although this should not provide a significant problem for short term lookahead. Multi-layer sets of rules, as described above, would improve the situation.

This prediction and simulation capability could be used by suitably programmed agents to foresee (and hence avoid) problems or to anticipate the actions of other agents. Such agents should appear to behave more intelligently than similar agents which act purely reactively.

A related possibility is that the agent could be arranged to use the results of the prediction module by comparing its virtual simulation with the behavior actually taking place in order to identify events or situations which are unexpected and which therefore need some special attention.

A further possible use for the prediction module virtual simulation is to provide a means of turning deliberate behavior of an agent into automatic behavior. If the deliberate behavior is repeated often enough, the prediction module will after a time become able to predict the behavior and hence reproduce it, leaving the original agent free to attend to other things without having to react to the cause of the deliberate behavior. This learning of automatic behavior by repetition provides the basis for an agent to learn skills by copying the behavior of another agent. It may also be employed to provide the basis for training agents by repeatedly guiding them and correcting them as described above.

A still further possibility is that predictions from the prediction module could be used to supplement the agents' perceptual processes to provide means for coping with occlusion. In other words perceived behaviors in the agents' environment will tend to continue to be apparent to the agent (i.e. be predicted by the prediction module) even if the agent is not currently getting sufficient information to perceive them directly.

Figure 5:
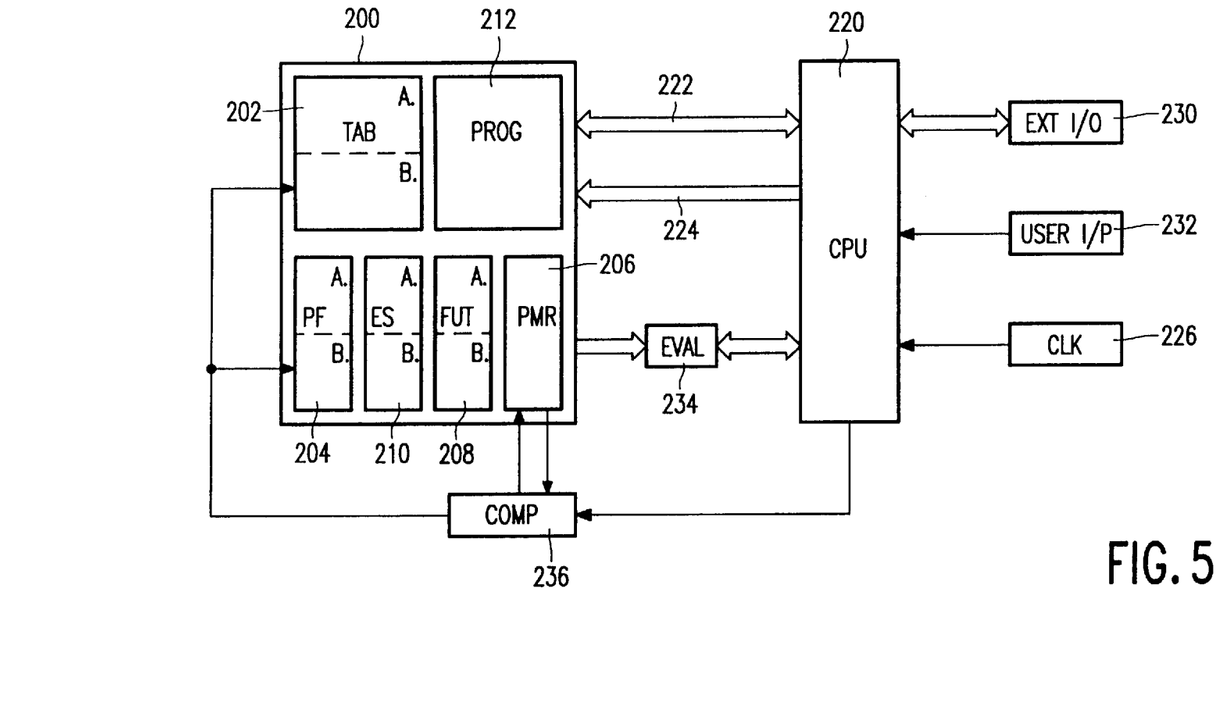
FIG. 5 is a block schematic diagram of a data processing apparatus embodying the invention.

FIG. 5 is a block schematic diagram of a data processing apparatus embodying the invention. A random access memory (RAM) 200 provides a number of discrete storage areas, a first of which at 202.A holds the table containing the element number EN, state S, queued status Q and propagate function start addresses SA for the compiled agents' rule set as described with reference to FIG. 2, and at 202.B a corresponding table for the compiled prediction module rule set. The agent and prediction module propagate functions PF starting at the start addresses are stored in respective parts 204.A and 204.B of another area of the RAM. The RAM 200 also provides further storage areas for future agent and prediction module element state changes 208.A and 208.B, respective event stacks 210.A and 210.B, and a program store 212. The program store 212 holds the operating instruction set for a central processing unit (CPU) 220. The program store 212 and the propagate functions 204 could, if desired, be stored in another memory device, for example a read only memory.

The RAM 200 is connected to the CPU 220 by a data bus 222 and an address bus 224 in known manner. Also in known manner, a clock (CLK) 226 is connected to the CPU 220. The CPU operates on the compiled agents from table 202.A and propagate function store 204.A, responding to the satisfaction of condition behaviors by generating one or more further behaviors defining the associated response. The program store 212 also contains those rules defining operation of the prediction module and the genetic algorithm to be applied. An external interface 230 is provided to the CPU for use, for example, where the agents are engaged in control of an external apparatus or process, and a user input 232 enables input of initial hypothesis data for the prediction module as previously described.

The RAM 200 maintains a record of at least a current population of prediction rules in compiled form (in 202.B and 204.B) alongside the compiled agent rules, as well as a record (in storage area 206) of those rules in non-compiled form—suitably as chromosomal representations for evaluation. Compilation of the prediction module rules from 206 to 202.B and 204.B is handled by compiler stage 236 suitably under control of the CPU 220.

The storage area 208.A for future agent element state changes is arranged as a two row table containing a plurality of time periods T and element numbers EN. Any number of elements numbers EN can be stored to correspond to a particular time period T and the states of these elements will all be changed during that time period. The table may be arranged for a consecutive sequence of time periods T, but it is preferred to use a stack containing only those time periods for which element numbers are stored, with the facility to insert element numbers and time periods as required due to operation of the program. A corresponding arrangement is provided in area 208.B for future prediction module element state changes.

Generally, all agent and prediction module element state changes except those corresponding to delay elements will be executed in the current time period although other element state changes can be also delayed if desired. Those element state changes which are to occur without a time delay may be placed in the respective event stacks 210.A, 210.B for execution in the near future - i.e. later in the current time period, but before moving to the next time period for which an event is specified.

In operation, whilst running the behaviors for each agent (suitably in response to external stimuli supplied via 230), the CPU periodically generates the chromosomal representation of an agents' state changes X and compares this with predictions A,B,C,D produced as the prediction module runs in parallel, each time updating a fitness value associated with each of the rules, based on the predictions. After a predetermined period the CPU 220 determines the fittest of the prediction rules and applies the genetic algorithm from program store 212 to generate a first mutated set of prediction rules. The predictions resulting from the mutated rules (as, for example, at II; FIG. 4) are then used 10 for further evaluation to guide subsequent mutation. It will be noted that FIG. 5 shows a separate hardware comparison/evaluation stage 234 although it will be readily understood that this procedure may equally be carried out in software in the CPU 220.

Following a desired period of evolution for the prediction rules, or when a predetermined threshold fitness level is reached, the compiled prediction rules for an agent are transferred from the lower to upper regions of those storage areas 202, 204, 208, 210 where they already exist in compiled form. This sub-set is then run by the CPU 220 (having disabled external input 230) in tandem with the existing agents' rules and determining the firing thereof. In this way, the agent continues to react as though still responding to external stimuli.

In the foregoing we have described a means for an agent to construct automatically a virtual simulation of its environment by learning to reproduce regularities in its own behavior in the course of interacting with its environment. This envisaging capability may be used by an agent to plan its actions ahead of time and hence behave more intelligently. Other possible uses of this learning mechanism by an agent are to anticipate the effects of its actions, to identify unexpected events, and to acquire new skills.

From reading the present disclosure, other modifications will be apparent to persons skilled in the art. Such modifications may involve other features which already known in the field of data processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A data processing apparatus including memory means having stored therein one or more agents defined by a first set of rules, each rule of said first set being in the form of a condition portion and an associated response portion, said condition portion of each rule requiring the presence of one or more specified agent behavior states or external inputs and said apparatus comprising means for responding to any said condition being satisfied by generating said associated response, characterized in that said apparatus has stored therein a second set of rules and is arranged to run said first set and second set in parallel, wherein each of said second set of rules generates a prediction of one or more agent state changes for said first set of rules, said apparatus further comprising means operable to monitor the prediction accuracy of one or more rules of said second set in accordance with predetermined criteria, to selectively modify said one or more rules of said second set until a level of accuracy in accordance with said predetermined criteria is met or exceeded, and to cause agent state changes of one or more rules of said first set in dependence on predictions of said second rule set.

2. Apparatus as claimed in claim 1, further comprising a storage means holding a respective fitness value derived for each said rule of said second set, said apparatus means operable to monitor prediction accuracy being arranged to increment and decrement said fitness values in response to relatively higher or relatively lower prediction accuracy.

3. Apparatus as claimed in claim 1, wherein said means operable to selectively modify said one or more rules of said second set comprises a processor operable to modify said rules in accordance with a pre-stored genetic algorithm.

4. Apparatus as claimed in claim 1, wherein said apparatus is arranged to add modified rules of said second set to that set, and to remove from said second set those rules having a prediction accuracy below a predetermined threshold level.

5. Apparatus as claimed in claim 1, further comprising a storage means holding a respective fitness value derived for each said rule of said second set, said apparatus means operable to monitor prediction accuracy being arranged to increment and decrement said fitness values in response to relatively higher or relatively lower prediction accuracy and wherein said means operable to selectively modify said one or more rules of said second set comprises a processor operable to modify said rules in accordance with a pre-stored genetic algorithm.

6. Apparatus as claimed in claim 5, wherein said apparatus is arranged to add modified rules of said second set to that set, and to remove from said second set those rules having a prediction accuracy below a predetermined threshold level.

7. A method as claimed in claim 5, wherein the step of selectively modifying one or more of said rules of said prediction module comprises generating a chromosomal representation of the or each said rule and applying a pre-stored genetic algorithm thereto.

8. Apparatus as claimed in claim 1, further comprising a storage means holding a respective fitness value derived for each said rule of said second set, said apparatus means operable to monitor prediction accuracy being arranged to increment and decrement said fitness values in response to relatively higher or relatively lower prediction accuracy, and wherein said apparatus is arranged to add modified rules of said second set to that set, and to remove from said second set those rules having a prediction accuracy below a predetermined threshold level.

9. Apparatus as claimed in claim 1, wherein said means operable to selectively modify said one or more rules of said second set comprises a processor operable to modify said rules in accordance with a pre-stored genetic algorithm, and wherein said apparatus is arranged to add modified rules of said second set to that set, and to remove from said second set those rules having a prediction accuracy below a predetermined threshold level.

10. A method of generating a virtual simulation of an environment for an agent defined by a first set of rules in a rule-based data processing system, wherein each of said rules is in the form of a condition portion and one or more further behaviors defining an associated response generated when said condition is satisfied, said method comprising:

providing a prediction module defined by a further set of rules, the respective response of each of said further set of rules comprising a prediction as to a state change for a specified behavior of said first set of rules in response to interaction by said agent with said environment;

placing said agent as defined by said first set of rules in interactive interrelationship with said environment and monitoring an accuracy of prediction by said prediction module as defined by said further set of rules;

selectively modifying one or more of said further set of rules until a level of the accuracy meets or exceeds a predetermined criteria; and generating a simulation of said environment based on said prediction module.

11. A digital data processing device comprising
a. a computer readable storage medium embodying rules for an agent including:
  i. a first set of stored rules, each rule being in the form of a condition portion and an associated response portion, the condition portion of each rule being responsive to one or more specified agent states or external inputs;
  ii. a second set of stored rules for predicting at least one change of state of the agent, said at least one change of state being responsive to the one or more external inputs, so that the prediction of the change of state of the agent is at least indirectly a prediction of the one or more external inputs;
b. processor means for
  i. carrying out behaviors of the agent in response to the first set of stored rules, agent states, and at least one external input;
  ii. monitoring whether the second set of stored rules properly predicted the behaviors; and
  iii. selectively modifying one or more rules of the second set until a prediction accuracy in accordance with a predetermined criteria is met or exceeded.

* * * * *